Figure 1:
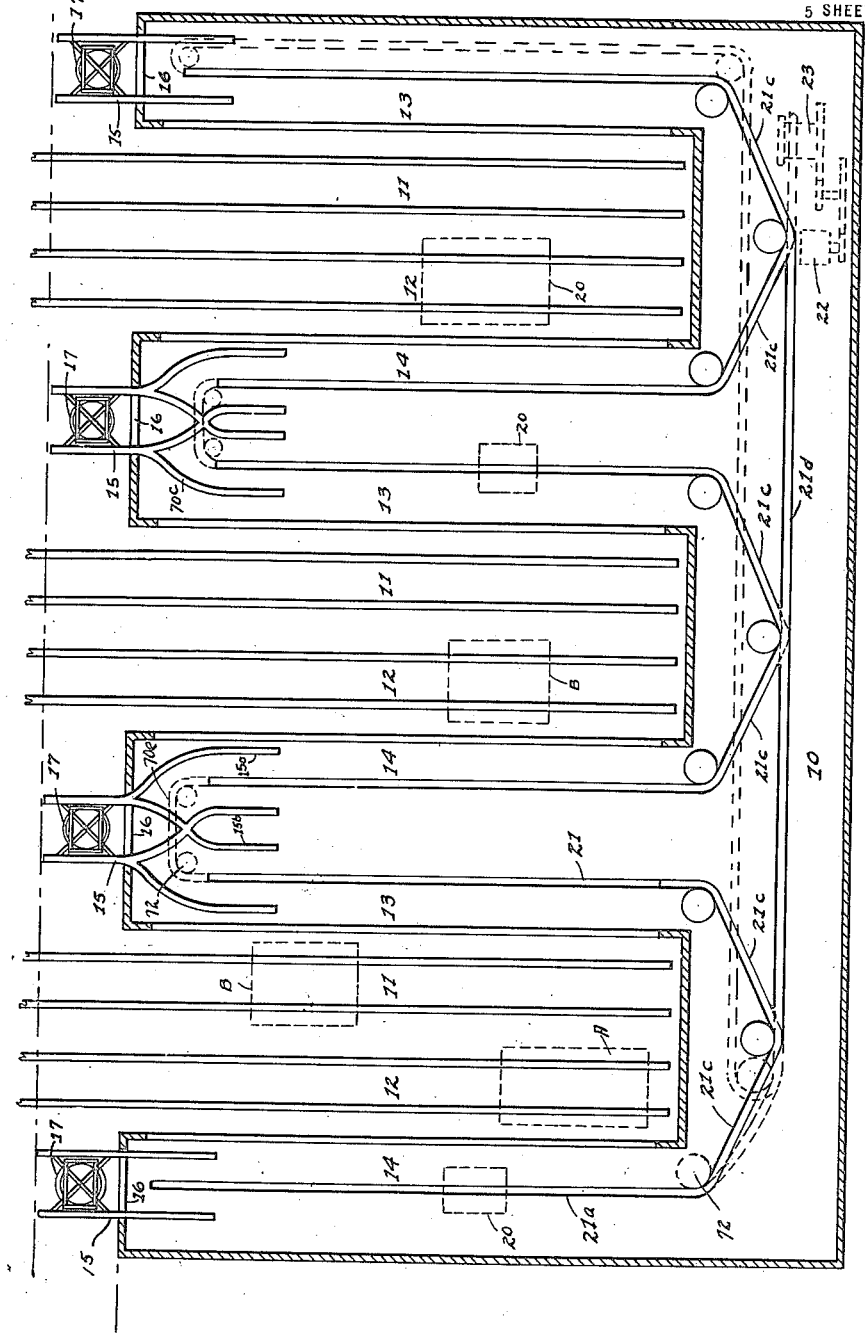

B. F. FITCH.
SYSTEM FOR TRANSPORTING FREIGHT.
APPLICATION FILED JULY 17, 1920.

1,404,948. Patented Jan. 31, 1922.
5 SHEETS—SHEET 1.

Inventor
Benjamin F. Fitch,
By Bakes & Macklin,
Attys.

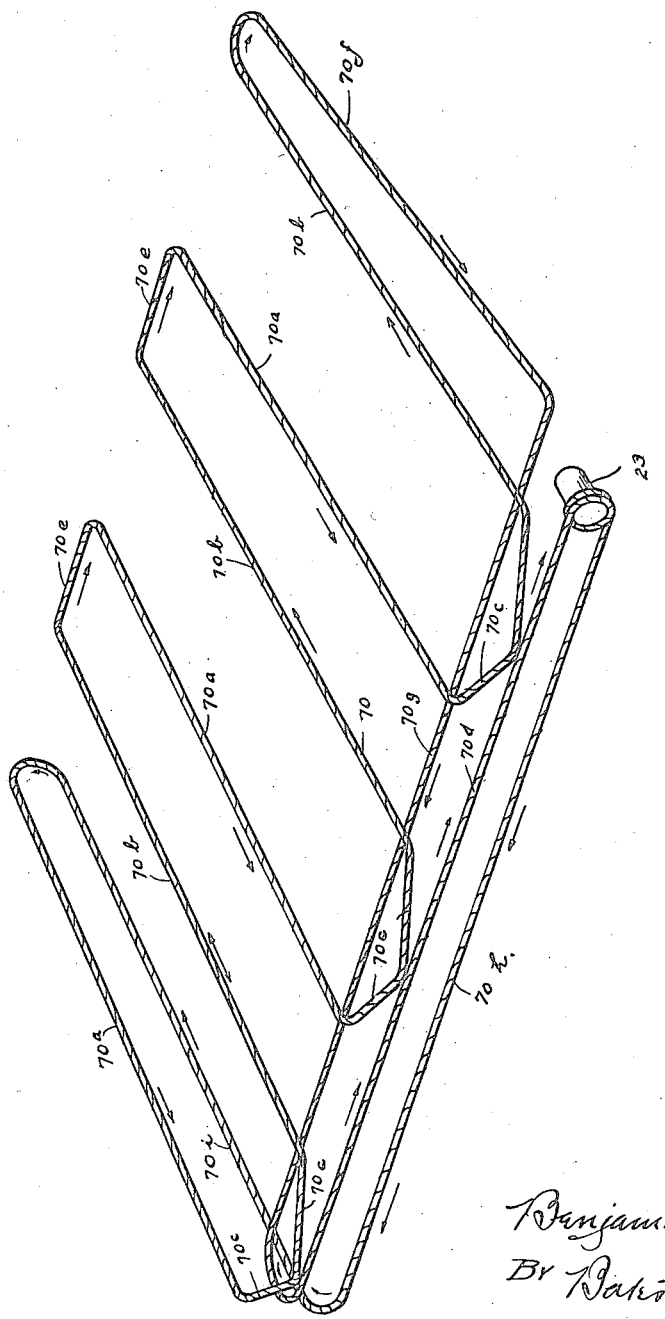

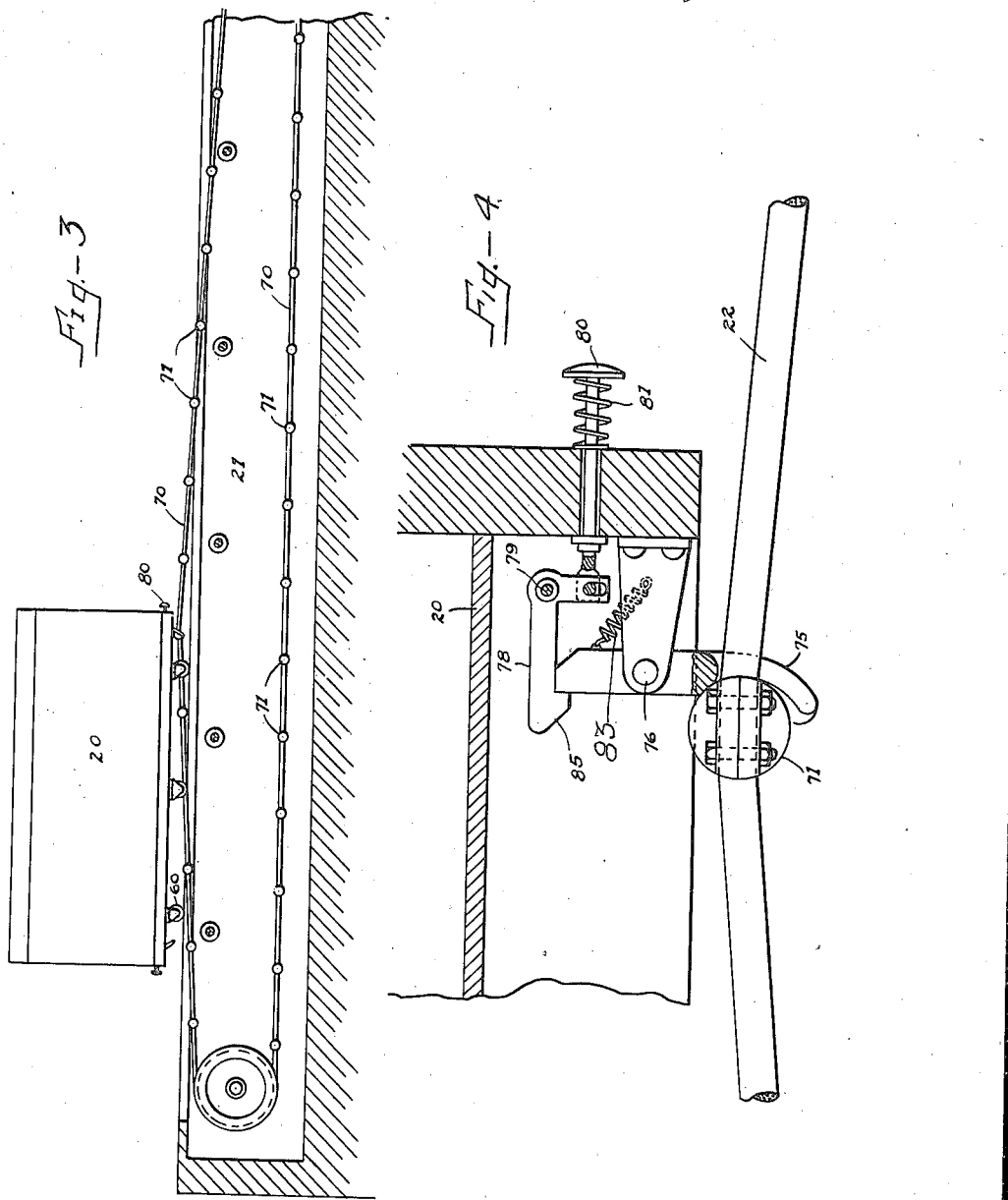

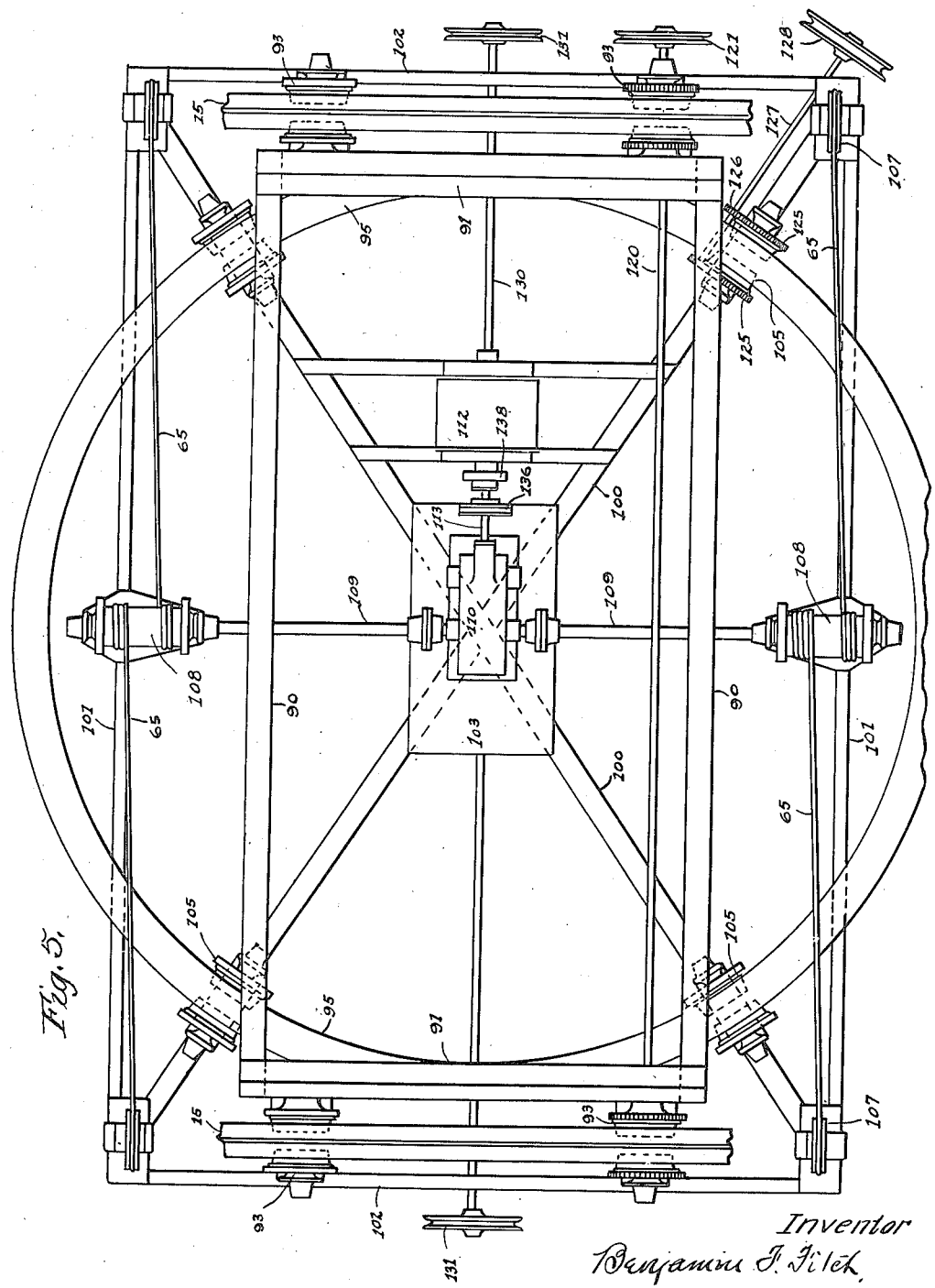

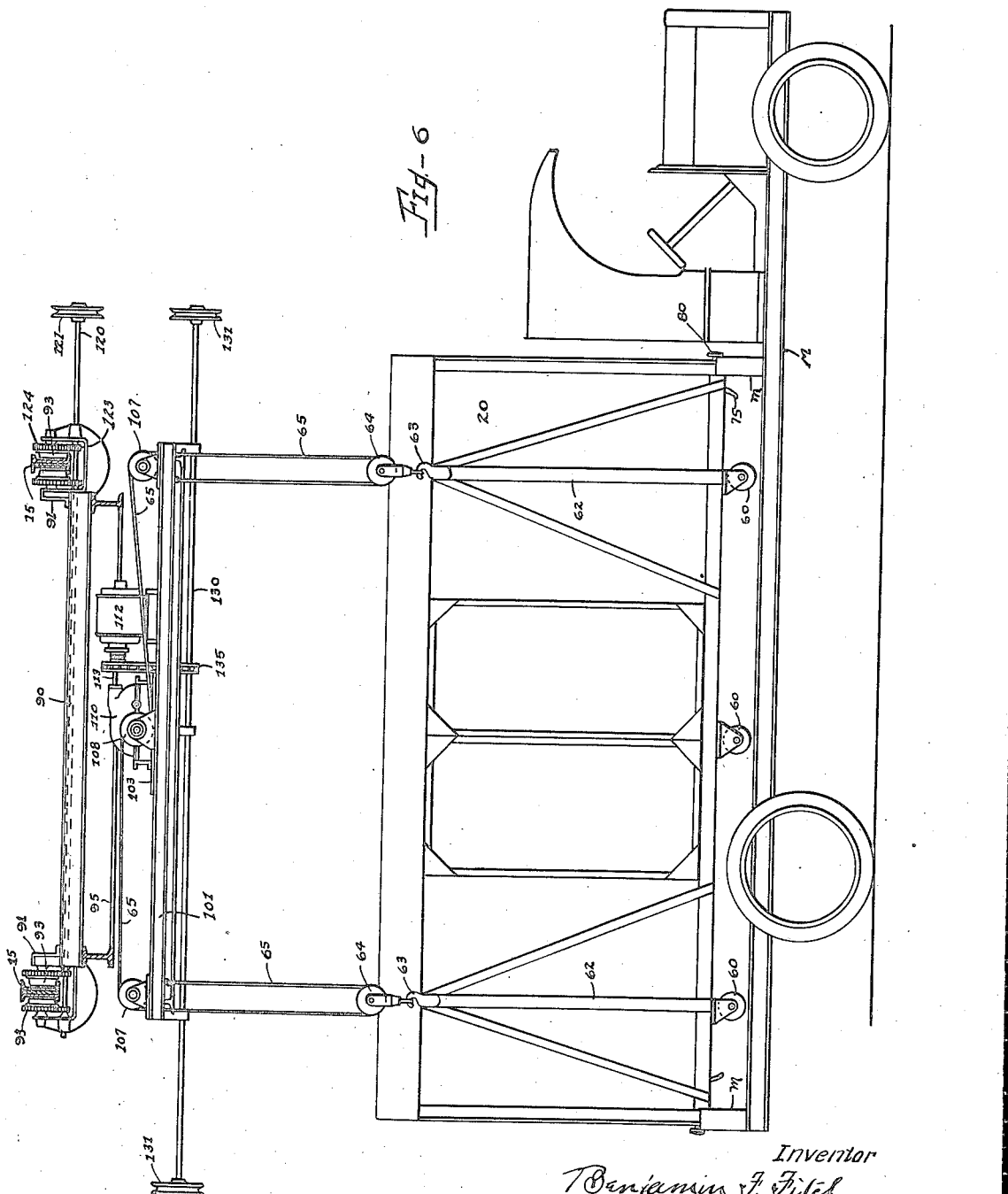

UNITED STATES PATENT OFFICE.

BENJAMIN F. FITCH, OF NEW YORK, N. Y., ASSIGNOR TO MOTOR TERMINALS COMPANY, OF WILMINGTON, DELAWARE, A CORPORATION OF DELAWARE.

SYSTEM FOR TRANSPORTING FREIGHT.

1,404,948.    Specification of Letters Patent.    Patented Jan. 31, 1922.

Application filed July 17, 1920. Serial No. 396,893.

*To all whom it may concern:*

Be it known that I, BENJAMIN F. FITCH, a citizen of the United States, residing at New York, in the county of New York and State of New York, have invented a certain new and useful Improvement in Systems for Transporting Freight, of which the following is a full, clear, and exact description, reference being had to the accompanying drawings.

This invention relates to the mechanical handling of freight at freight houses, platforms, wharfs, docks, etc. More particularly, the system contemplates the employment of automobile trucks having removable bodies, which with their contained loads may be removed as a unit from the truck frame and suitably transported onto the platform, dock or other place where the system is installed, so that the contents of the body may be readily transferred therefrom to railroad trains, boats, or in some instances the entire body with its load placed on board. A reverse operation transfers the freight from an incoming train or boat to an automobile truck, enabling its transportation over city streets. My invention provides for the transportation of removable bodies into and out of freight houses, etc. through contracted doorways and for the moving of the bodies by power along the platforms or floors. The various features of the invention are hereinafter more fully explained and the essential characteristics are summarized in the claims.

In the drawings, Fig. 1 is a diagrammatic sectional plan of a freight house equipped with my invention; Fig. 2 is a view in perspective of an endless conveying cable as arranged beneath slots in the floor of the freight house shown in Fig. 1; Fig. 3 is a vertical longitudinal section through a freight house, showing the transporting cable construction; Fig. 4 is a detail in vertical section showing the releasable connection between a truck body and the cable; Fig. 5 is a plan of a traveling crane adapted for use in this system; and Fig. 6 is a side elevation, partly in section, of the travelling crane shown in Fig. 5, this view showing also a removable automobile body about to be raised from its truck by said crane.

In Fig. 1, there is indicated a freight house, having a series of alternate stub end inbound and outbound tracks 11 and 12 respectively, arranged in pairs between inbound and outbound platform 13 and 14 respectively. The city street C along which freight is brought to the freight house and carried from it is supposed to extend along the left hand end of the building indicated.

15 indicates pairs of over-head trackways, each pair extending from a position over the street to the interior of the house over the corresponding platform and through a suitable doorway 16. Those over the intermediate platform portions have branch portions 15$^a$ and 15$^b$ leading over the forward ends of the hereinafter referred to outbound and inbound slot portions 21$^a$ and 21$^b$, respectively. Mounted on each of these pairs of trackways is a suitable bridge crane designated 17, which carries a turn table. This crane is adapted to engage the removable body of an automobile body beneath it, turn it a quarter way around and then travel with it through the doorway to position it lengthwise of the platform within the building. Several removable bodies appear in this figure indicated by dotted lines 20. 21 indicates a slot in the floor, beneath which is an accessible endless cable 70 extending along the platforms and moving toward the front of the inbound platforms 13, and from one platform side to another across or between the ends of the second platform portions as indicated by the arrows in Fig. 2 and toward the rear of the outbound platforms 14. A suitable motor 22 and windlass mechanism 23 may serve to propel this cable. Suitable means are provided for gripping each removable body to it.

The details of a convenient form of turn table bridge crane, and convenient means for gripping the automobile body to the cable will be hereinafter described. For the present let it be assumed that each removable body has wheels in its base by which it may be supported and rolled along the platform and that beneath the slots 21 is a cable 70 which may be gripped to the bodies. Now if an automobile truck having a loaded body is driven in front of a doorway 16, the body may be raised by the crane 17, turned at right angles, and trolleyed through the doorway and deposited lengthwise of a platform 14 in a convenient position where its contents may be hand-trucked to a receiving car A, standing on the outbound track.

After a removable body has been unloaded, the body may be gripped to the cable and drawn thereby over the rear end platform 10 onto an inbound platform 13. There the bodies 20 are loaded; for instance, by hand-trucking from the car B standing on the inbound track. Then the body is transported by the cable to the front end of an inbound platform beneath the overhead trackway 15. Then it may be raised by the crane on this trackway, and trolleyed through a doorway 16, turned at right angles, and deposited on a truck body in the street C. The automobile trucks may thus arrive loaded in front of one doorway 16, and the truck frame moved empty under its own power across the tracks to a position in front of a second doorway 16, and there receive a loaded body for transportation over a city street.

As shown in Fig. 1, the slot 21 in the freight house floor or platform comprises a plurality of parallel reaches $21^a$ adjacent to the outbound tracks 12, and a plurality of reaches $21^b$ adjacent to the inbound tracks 11, these reaches being connected at the rear by short diagonal slots $21^c$. Also in the rear platform 10 is a slot $21^d$ connecting the rear ends of the slots $21^c$. Beneath these several portions of the slot 21, the endless cable 70 passes around guide pulleys 72 and over the windless mechanism 23, in the manner illustrated by the arrows in Fig. 2. Reaches $70^a$ and $70^b$ of the cable 70 lie below the corresponding outbound and inbound portions of the slot 21, while portions $70^c$ and $70^d$ lie below the slot portions $21^c$ and $21^d$. Portions $70^e$ across the front ends of the intermediate platform portions, and $70^f$ and $70^g$ along one side and across the rear, respectively, of the freight house, all lying beneath no slot portion, and portions $70^h$ and $70^i$ extending beneath the portions $70^d$ and $70^a$, respectively, are all idle, that is, are not adapted to be gripped by the removable bodies 20, but merely serve as connecting reaches for the operative portions directly beneath the various portions of the slot 21.

With this construction, a removable body 20 may be gripped to the cable over a portion $70^a$ and drawn thereby over the slot portions $21^a$, $21^c$ and $21^b$ to enable a load to be transferred to or from the freight cars A or B spotted on the tracks 11 or 12. If additional load is to be transferred to or from cars spotted on another set of stub end tracks, the connection between the movable body and the cable will be released in a manner hereinafter described and the body rolled over the platform to the opposite side where another reach of the cable is gripped and the body is moved as before around the stub end tracks. If no load is to be transferred to or from cars on the intermediate stub end tracks the cable connection with the body 20 may be changed at the junction of the cable portions $21^c$ and $21^d$.

It will be seen that in the installation illustrated, I employ a traveling crane, a short trackway therefor, sufficient to transport the body from the automobile runway to the platform and vice versa. I also employ a traveling cable to draw the body along the platform. Fig. 6 illustrates an automobile truck equipped with a removable body having wheels in its base, which is adapted for use in part of my system. This view and also Fig. 5 illustrate a traveling crane with a turn table which may be employed to elevate the body and turn it or lower it. Figs. 3 and 4 illustrate a convenient cable mechanism for drawing the body along the platform after it has been deposited thereon.

The removable body 20 may be of any convenient form adapted to be mounted on an automobile body and having wheels in its base, by which it may be rolled on a platform. In Fig. 6, M indicates the automobile frame. The body 20 is arranged to be supported thereby, the frame having suitable centering means indicated at m. 60 indicates the supporting wheels carried by the body. I find it convenient to provide a pair of these respectively near the opposite edges and swiveled pairs near the front and a swiveled pair near the rear, these latter pairs being comparatively close together. This construction enable the convenient manipulation of the body and also provides for the cable being central with reference to the body and out of engagement with any of the wheels. 62 indicates suitable supports on the body terminating in hooks 63, near the top of the body, which may be engaged by movable pulleys 64 on the crane mechanism. When these pulleys are drawn up by their respective cables 65, the body is elevated evenly and may be turned, trolleyed through the doorway and deposited on the platform or vice versa.

Referring to Figs. 3 and 4, there will be seen in or below the cable slot 21, the cable 70 having on it at intervals, suitable stops 71 which may be in the form of ball shaped members clamped on the cable (these stops being omitted from Fig. 2 for convenience). Each removable body 20 is equipped with a jaw 75 pivoted at 76 to a bracket 77, the jaw having a fork at its lower end adapted to straddle the cable and be engaged by the adjacent ball 71 thereon. Above the pivot, this jaw is normally held by a latch 78 which is in the form of a bell crank pivoted at 79. The other arm of this bell crank is connected with a plunger 80, which is normally held in the position shown in Fig. 4 by a spring 81.

When the cable 70 is moving in the direction of the arrow in Fig. 4, the ball stop 71 engaging the hook 75 of a removable body will pull the upper end of that jaw tightly against the latch 78 which stops it, making it rigid, so that the pull of the cable moves the whole body toward the right. When the body comes into contact with the preceding body, and it is desirable that its connection with the slowly moving cable be released, its plunger 80 is thereby forced inwardly against the action of the spring 81. This raises the latch 78 and releases the jaw 75 and the lower end of it swings forward and thus drops the cable. Then the jaw is drawn back to normal position by its spring 83, the inclined upper end 84 of the jaw striking and sliding below the inclined end 85 of the latch. The spring 83 therefore holds the jaw in position for reengaging the latch whenever the pressure on the bumper head 80 is removed.

The entrance from the top into the cable slot 21 may readily be narrow enough so that it would not be possible for any of the wheels 60 to drop into the slot. The slot is somewhat wider however than the diameter of the ball 71. The unengaged part of the cable lies entirely beneath the platform floor in the cable conduit, but whenever it is desired to couple the car to the cable, the cable may be simply lifted manually (as by means of the handbook passed through the cable slot) so that the cable passes through the fork of the jaw 75. Then as soon as the next ball 71 engages the jaw the rearwardly curved lower portion of the jaw together with the pull on the cable will cause continuous engagement of the cable and body 20 until the bumper plunger 80 is engaged or the pull on the cable stops.

In some installations it is desirable to operate the cable continuously and in others to operate it intermittently. The latch provides not only for the automatic uncoupling of the body and cable whenever the body reaches the end of its available travel, but provides convenient means whereby the attendant may release the body whenever desired by simply pushing with his foot on the plunger head 80. It is to be understood that though the transportation is as rapid as desirable and convenient on a freight platform, it is comparatively slow in miles per hour and the attendant has no difficulty in either raising the running cable to clutch it to the car or operating the plunger head 80 with his foot to release it.

The characteristics of the traveling crane, which I employ are that it has a bridge frame with wheels running on the two parallel trackways 15, has a supplemental frame swiveled to the bridge frame, and has four raising members depending from the supplemental frame and adapted to engage four hooks on opposite sides and near opposite ends of the removable body. The particular traveling crane shown in Figs. 5 and 6 forms part of the subject matter of my application No. 292513 filed April 24, 1919, and is claimed therein, and reference may be had to that application for fuller description. Briefly it is as follows, reference being had to Figs. 5 and 6.

The bridge frame of the traveling crane shown is an open horizontal structure comprising cross beams 90 and end beams 91 which are parallel with the trackways 15. These beams 91 carry four sets of supporting wheels 93, each set being located at one of the corners of the frame and comprising a pair of wheels tracking on the lower flange of the trackway 15. The frame also carries a turn table or circular trackway 95 beneath the frame. The supplemental frame shown comprises diagonal beams 100 and front and rear beams 101 and end beams 102 connecting with the ends of the diagonal beams, and a gusset plate 103 mounted on and bracing the diagonal beams. These diagonal beams carry four sets of wheels 105, each set comprising a pair of wheels adapted to track on the lower flange of the circular trackway 95.

On each corner of the supplemental frame is a guide sheave 107 over which a cable 65 depends. Suitable means are provided for drawing up on the four cables at once, so that the body 20 may be raised evenly at four points. For simultaneously operating the four cables 65, I have provided two drums 108 on aligned shafts 109. These shafts connect with suitable gear reduction mechanism contained in a housing 110, mounted on the gusset plate 103. A suitable motor 112 is connected with the gearing, as for instance, by a worm coupled with the armature shaft 113, and meshing with a worm wheel (not shown) in the casing.

It will be seen that the removable body may be raised or lowered by the operation of the motor 112, and that when the body is free from the automobile frame, it may be turned about a vertical axis by swinging the supplemental frame on the supporting frame, the wheels 105 rolling around the trackway 95. The whole structure, whether the body be turned or not, may be transported by moving the main frame along the trackway 15.

To move the main frame on the trackway, I prefer to provide a shaft 120 having a hand chain wheel 121, and on this shaft I place pinions 123 meshing with gears 124 formed on the corresponding supporting wheels 93. As shown, the shaft extends entirely across the frame and is geared with two sets of wheels at the two front corners of the frame. To shift the supplemental frame on the main frame, I provide one of the pairs of wheels 105 with gears 125 which mesh with pinions 126 on a shaft 127 which has a hand chain wheel 128. The hand chain wheels 128 and 121 are located adjacent each other so that one attendant may conveniently operate both hand chains.

To enable the operation of the raising cables by hand power, should electric current not be available, I provide a shaft 130 carried on the supplemental frame and having hand chain wheels 131 at its ends. On this shaft is a sprocket wheel connected by a sprocket chain 135 with a sprocket wheel 136 loose on the worm shaft 113. This worm shaft is normally clutched to the armature and has means whereby it may be clutched to the sprocket wheel 136. When so clutched the hand chains on the wheels 131 may operate the raising cables.

It should be noted that this application is a continuation in part of my former application No. 297,461, filed May 16, 1919, for a system of handling freight, many of the claims being taken from that application and many of the views being identical in the two cases.

Having thus described my invention what I claim is:—

1. The combination with a building having a wall with a doorway, a pair of trackways extending from the interior of the building through the doorway to the exterior, a travelling crane riding on said trackway and adapted to engage a removable vehicle body and raise it and turn it about a vertical axis means for shifting the crane through the doorway whereby the body may be deposited on a platform, a cable movable lengthwise of the platform within the building, and means for gripping said cable to the removable body deposited on said platform.

2. The combination with a building having a wall with a doorway, of a pair of overhead trackways extending from the interior of the building through the doorway to the exterior, a travelling crane having a main frame with wheels on said trackways and having a supplemental frame adapted to turn on the main frame, sheaves carried by the supplemental frame, elevating cables extending over said sheaves and adapted to engage a removable automobile body at a plurality of points, means for turning the supplemental frame about a vertical axis, and means for shifting the main frame to transport the body through the doorway, a cable movable lengthwise of the platform within the building, and means for gripping said cable to such removable body deposited on said platform.

3. The combination, with a vehicle body having wheels in its base, of a building having a wall with a doorway, a pair of trackways extending from the interior of the building through the doorway to the exterior, a travelling crane, having a main frame with wheels on said trackways and having supplemental frame adapted to turn on the main frame, elevating cables on the supplemental frame adapted to engage said body, means for turning the supplemental frame and body about a vertical axis, means for shifting the main frame to transport the body through the doorway, a cable located in a conduit below the floor level of the platform and extending lengthwise thereof and accessible through a slot in the platform, and means on the removable vehicle body for clutching it to the cable.

4. The combination with a vehicle body having wheels in its base, of a platform on which the body may be deposited, a cable movable lengthwise of the platform, and an arcuate jaw carried by the body and adapted to grip the cable, and a bumper overhanging the forward end of the body for releasing said jaw from contact with the cable.

5. The combination with a platform, of a conduit beneath it, a slot through the platform communicating with the conduit, a cable normally in said conduit, a body having wheels in its base and adapted to roll on the platform, a jaw carried by the body and adapted to clutch a portion of the cable above the slot, a latch above the jaw and means for releasing the latch.

6. The combination of a platform, a cable movable along the same and having thereon periodically arranged stops, a body having wheels resting on the platform, a member carried by the body and adapted to engage a stop on the cable, a latch carried by the body for holding the member and a longitudinally movable member at one end of the body for tripping the latch and releasing the body.

7. The combination of a platform, a cable movable along the same, a body having wheels resting on the platform, a jaw carried by the body and adapted to engage the cable, and means slidably mounted on the forward end of the body and adapted to be engaged and moved longitudinally of the body to release the jaw.

8. The combination of a platform, a cable movable along the same, a body having wheels resting on the platform, a jaw carried by the body and adapted to engage the cable, and a longitudinally movable bumper accessible at the forward end of the body and adapted to be engaged and moved to release the jaw.

9. The combination of a platform having a slot therein, a cable having a succession of enlargements thereon and normally positioned therebeneath the slot, a movable body having supporting wheels, and an arcuate jaw carried by said body and having a fork adapted to extend about the cable and engage the enlargement.

10. The combination of a platform having a slot, a cable beneath the slot having a succession of enlargements thereon, adapted to be raised through the slot, a movable body having supporting wheels adapted to roll on the platform, and a jaw carried by said body and adapted to extend about the cable and engage the enlargement, when the cable is raised through the slot.

11. The combination of a cable having a succession of enlargements thereon, a movable body having supporting wheels, and a jaw carried by said body and having a fork adapted to extend about the cable and engage the enlargement, and means movable longitudinally of the body to release said jaw.

12. The combination of a cable having a succession of enlargements thereon, a movable body having supporting wheels, a jaw carried by said body and adapted to engage the enlargement, a latch for said jaw, and means to release the latch.

13. The combination of a cable having enlargements arranged periodically thereon, a body having supporting wheels, a jaw carried by the body and adapted to straddle the cable and engage the enlargements, a latch adapted to hold the jaw in active position, and a movable bumper carried by the body adapted to release the latch.

14. The combination with a platform having a slot, of a cable beneath the slot, having enlargements arranged periodically thereon, and adapted to be raised above the slot, a body having supporting wheels adapted to roll on said platform, means carried by the body and adapted to engage the enlargements, and a movable bumper carried by the body adapted to release said means.

15. The combination of a cable provided with periodic enlargements rigidly mounted on it, a body having supporting wheels and having a jaw pivoted to the body and adapted to engage one of the enlargements, said jaw extending beyond its pivot, a pivoted latch adapted to engage the extended end of the jaw, a movable bumper connected with the latch adapted to move it to idle position, and a spring tending to restore said bumper and latch.

16. The combination of a cable provided with periodic enlargements rigidly mounted on it, a body having supporting wheels and having a bifurcated jaw pivoted to the body and adapted to straddle the cable and engage an enlargement, a latch adapted to engage and restrain the jaw, a movable bumper connected with the latch adapted to move it to idle position, and a spring tending to restore said bumper and latch.

17. The combination of a cable having stops thereon at regular intervals, a body having supporting wheels, and a jaw carried by said body and adapted to engage a stop on the cable, said jaw having its engaging portion extending rearwardly and thereby tending to support the cable when one of the stops is engaged.

18. The combination of a cable provided with regularly positioned enlargements, of a body having wheels, a bifurcated jaw carried by the body and adapted to straddle the cable and engage the enlargement, said jaw hooking rearwardly sufficiently to support the cable when the same is moving but to release it by gravity when the cable stops.

19. The combination of a series of platforms interspaced between regions adapted to contain transporting means, a transverse platform connecting the ends of each of said platforms in series, a slot extending continuously along the transverse platform and along each of the end platforms in the series and a pair of slots extending along each of the intermediate platforms in the series and connected with the slot on the transverse platform, an endless cable movable beneath each of said slots, a body resting on a platform and means for connecting the cable with the body.

20. The combination of a series of platforms, a series of transportation lines interspaced therebetween, a cable movable along said platforms, a body resting on a platform, and means carried by the body adapted to engage the cable whereby it may be moved, and a movable bumper carried by the body and adapted to release said means.

21. The combination of a series of platforms interspaced between stub end railroad tracks, a cable movable along said platforms and normally positioned therebeneath, a body resting on one of the platforms and means carried by the body for gripping the cable, said means being adapted to engage the cable above the platform and to support it in such raised position.

22. The combination of a series of platforms, transportation lines arranged between said platforms, an endless cable having reaches movable along said platforms, movable bodies adapted to rest on said platforms, and means for engaging the cable to said bodies, whereby they may be moved along the platforms thereby, said means being arranged to engage and hold the cable above the platforms.

23. The combination of a series of platforms, transportation lines arranged between said platforms, an endless cable having reaches movable along said platforms, a movable body adapted to rest on said platforms, means on said body for gripping said cable, and means extending forwardly of the body and movable longitudinally thereof for releasing the cable gripping means.

24. The combination of a series of platforms, stub end railroad tracks arranged in pairs between said platforms, an endless cable having reaches movable along said platforms, movable bodies adapted to rest on said platforms, means on said bodies whereby they may readily grip or release said cable reaches to be moved along the platform thereby, and a member extending forwardly of the body for releasing said means.

25. The combination of a series of platforms, means for supporting a freight vehicle between said platforms, a transverse platform joining the ends of said series of platforms, slots in each of the platforms of said series, the ends of said slots adjacent to said transverse platform being connected by slots therein, an endless cable movable beneath said slots, movable bodies adapted to rest on said platforms, there being means whereby they may be readily connected to said cable for movement therewith.

26. The combination of a series of platforms, stub end railroad tracks arranged between said platforms in pairs, a transverse platform joining the ends of said series of platforms across the ends of said tracks, a slot in each of the platforms of said series corresponding to each of said tracks, the ends of said slots adjacent to said transverse platform being connected by slots therein, and endless cable movable beneath said slots, movable bodies adapted to rest on said platforms, having means whereby they may be readily connected to said cable for movement therewith.

27. The combination of a series of platforms, stub end railroad tracks arranged between said platforms in pairs, each consisting of an inbound and an outbound track, a transverse platform joining the ends of said series of platforms across the ends of said tracks, a slot in each of the platforms of said series corresponding to each of said tracks, the ends of said slots adjacent to said transverse platform being connected by slots therein, a cable movable over guide pulleys beneath said slots and portions of said platforms between them, movable bodies having wheels resting on the platforms, and having means for readily attaching them to or disengaging them from said cable, whereby they may be released from the cable beneath one slot and rolled over the platform and reconnected to the cable beneath another slot.

In testimony whereof, I hereunto affix my signature.

BENJAMIN F. FITCH.